(12) United States Patent
Barkan et al.

(10) Patent No.: US 12,198,512 B2
(45) Date of Patent: Jan. 14, 2025

(54) METHODS AND APPARATUS TO INDICATE OFF-PLATTER WEIGH CONDITIONS

(71) Applicant: ZEBRA TECHNOLOGIES CORPORATION, Lincolnshire, IL (US)

(72) Inventors: Edward Barkan, Miller Place, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/799,512

(22) Filed: Feb. 24, 2020

(65) Prior Publication Data
US 2021/0264746 A1 Aug. 26, 2021

(51) Int. Cl.
*G06K 7/10* (2006.01)
*G07G 1/00* (2006.01)
*G01G 19/40* (2006.01)

(52) U.S. Cl.
CPC .......... *G07G 1/0054* (2013.01); *G06K 7/10* (2013.01); *G01G 19/40* (2013.01)

(58) Field of Classification Search
CPC ......... G07G 1/0054; G06K 7/10; G01G 19/40
USPC .......................................................... 705/23
See application file for complete search history.

(56) References Cited

U.S. PATENT DOCUMENTS 5,898,158 A * 4/1999 Shimizu .............. G07F 7/025
235/383

2011/0132985 A1 6/2011 McQueen et al.
2021/0199488 A1* 7/2021 O'Donnell ............. G01G 23/36

FOREIGN PATENT DOCUMENTS

WO 20120167196 A2 12/2012

OTHER PUBLICATIONS

Combined Search and Examination Report for the Great Britain Application No. GB2101928.6 mailed on Nov. 22, 2021.
Office Action for Office Action for German Patent Application No. 102021103298.9 mailed on Mar. 14, 2024.

* cited by examiner

*Primary Examiner* — Daniel A Hess
(74) *Attorney, Agent, or Firm* — Yuri Astvatsaturov

(57) ABSTRACT

Methods and apparatus to indicate off-platter weigh conditions are disclosed herein. An example barcode reading and weighing apparatus includes: a weigh platter having a surface extending in a first transverse plane; a scale configured to measure a weight of an item on the surface; an off-platter detection assembly configured to detect whether a portion of the item is not resting on the weigh platter; a communication interface configured to communicate with a POS system; a processor in communication with the weigh platter, the off-platter detection assembly and the communication interface; and a non-transitory computer-readable storage medium storing instructions that, when executed by the processor, cause the barcode reading and weighing apparatus to, when the portion of the item is not resting on the weigh platter, modify the weight to form a modified weight and send the modified weight to the POS system via the communication interface, wherein the weight is modified to indicate the portion of the item a3was not resting on the weigh platter.

23 Claims, 6 Drawing Sheets

METHODS AND APPARATUS TO INDICATE OFF-PLATTER WEIGH CONDITIONS

BACKGROUND

One of the main functions of a weigh platter, whether used alone or in conjunction with a barcode reader at a point-of-sale (POS) station, is to weigh produce or other products that are priced by weight in order to assist in determining the price of the produce or product. However, produce and products are varied in shape and size and there can be issues where part of the produce or product sits off of the weigh platter, resulting in incorrect weight measurement and, therefore, incorrect pricing. Therefore, there is a need to be able to identify such off-platter weigh conditions to the POS system.

SUMMARY

Methods and apparatus to indicate off-platter weigh conditions are disclosed herein. Examples and combinations thereof include at least the following.

In an embodiment, a barcode reading and weighing apparatus includes: a weigh platter having a surface extending in a first transverse plane; a scale configured to measure a weight of an item on the surface; an off-platter detection assembly configured to detect whether a portion of the item is not resting on the weigh platter; a communication interface configured to communicate with a point-of-sale (POS) system; a processor in communication with the weigh platter, the off-platter detection assembly and the communication interface; and a non-transitory computer-readable storage medium storing instructions that, when executed by the processor, cause the barcode reading and weighing apparatus to, when the portion of the item is not resting on the weigh platter, modify the weight to form a modified weight and send the modified weight to the POS system via the communication interface, wherein the weight is modified to indicate the portion of the item was not resting on the weigh platter.

In variations of this embodiment, the storage medium stores further instructions that, when executed, cause the barcode reading and weighing apparatus to, when the item is wholly resting on the weigh platter, send the weight to the POS system via the communication interface.

In variations of this embodiment, modifying the weight includes modifying the weight to represent and out-of-bounds weight, to represent an invalid weight, to include a letter, to have an inverted sign, etc.

In variations of this embodiment, the off-platter detection assembly includes: a light emission assembly having a light source, the light emission assembly configured to emit a light away from a proximal edge of the surface; and a light detection assembly having a light sensor, the light detection assembly configured to detect at least a portion of the light reflected towards the proximal edge.

In another embodiment, a method of weighing an item with a barcode reading and weighing apparatus, the method includes: determining a weight of an item on a weigh platter of the barcode reading and weighing apparatus; detecting whether a portion of the item is not resting on the weigh platter; when the portion of the item is not resting on the weigh platter, modify the weight to form a modified weight to indicate that the portion of the item was not resting on the weigh platter; and sending the modified weight to a point-of-sale (POS) system.

In variations of this embodiment, the method further includes when the item is wholly resting on the weigh platter, sending the weight to the POS system.

In variations of this embodiment, modifying the weight includes modifying the weight to represent and out-of-bounds weight, to represent an invalid weight, to include a letter, to have an inverted sign, etc.

In a further embodiment, a barcode reading and weighing apparatus includes: a weigh platter having a surface extending in a first transverse plane; a scale configured to measure a weight of an item on the surface; an off-platter detection assembly configured to detect whether a portion of the item is not resting on the weigh platter; a communication interface configured to communicate with a point-of-sale (POS) system; a processor in communication with the weigh platter, the off-platter detection assembly and the communication interface; and a non-transitory computer-readable storage medium storing instructions that, when executed by the processor, cause the barcode reading and weighing apparatus to, when the portion of the item is not resting on the weigh platter, disable the weigh platter and provide an alert.

In variations of this embodiment, the storage medium stores further instructions that, when executed, cause the weigh platter to provide an alert when the portion of the item is not resting on the weigh platter.

In variations of this embodiment, the storage medium stores further instructions that, when executed, cause the weigh platter to, when the item is wholly resting on the weigh platter, send the weight to the POS system via the communication interface.

In an additional embodiment, barcode reading and weighing apparatus includes: a weigh platter having a surface extending in a first transverse plane; a scale configured to measure a weight of an item on the surface; an off-platter detection assembly configured to detect whether a portion of the item is not resting on the weigh platter; a communication interface configured to communicate with a point-of-sale (POS) system; a processor in communication with the weigh platter, the off-platter detection assembly and the communication interface; and a non-transitory computer-readable storage medium storing instructions that, when executed by the processor, cause the barcode reading and weighing apparatus to: identify a weight priority associated with the item, when the weight priority is a first priority and the item is not wholly resting on the weigh platter, provide an indication that the item is not wholly resting on weigh platter, and when the weight priority is a second priority and the item is not wholly resting on the weigh platter, send the weight measured by the scale to a POS system.

In variations of this embodiment, wherein the first priority is associated with at least one of a more expensive item or a higher cost-per-unit-weight item, and the second priority is associated with at least one of a less expensive item or a lower cost-per-unit-weight item and, in some further variations identify the item with the first priority or the second priority based on a user controllable threshold.

In variations of this embodiment, the storage medium stores further instructions that, when executed by the processor, cause the barcode reading and weighing apparatus to determine an identification of the item using at least one of an object recognition algorithm trained using machine learning, a barcode or a radio frequency identification (RFID) tag, and compare the identification with a list of identifiers associated with priority items.

In yet another embodiment, a method of weighing an item with a barcode reading and weighing apparatus includes: determining a weight of an item with a weigh platter of the barcode reading and weighing apparatus; detecting whether a portion of the item is not resting on the weigh platter; identifying a weight priority associated with the item; when the weight priority is a first priority and the item is not wholly resting on the weigh platter, providing an indication that the item is not wholly resting on weigh platter; and when the weight priority is a second priority and the item is not wholly resting on the weigh platter, sending the weight measured by the barcode reading and weighing apparatus to a point-of-sale (POS) system.

In variations of this embodiment, the method further includes when the weight priority is the first priority and the item is not wholly resting on the weigh platter, additionally providing the measured weight to the POS system.

In variations of this embodiment, the method further includes: alerting a user of the barcode reading and weighing apparatus of an invalid weight when the weight priority is the first priority and the item is not wholly resting on the weigh platter; and not alerting the user when the weight priority is the second priority and the item is not wholly resting on the weigh platter.

In a still further embodiment, a point-of-sale (POS) system includes: a communication interface configured to communicate with a barcode reading and weighing apparatus; a processor; and a non-transitory computer-readable storage medium storing instructions that, when executed by the processor, cause the POS system to receive from the barcode reading and weighing apparatus via the communication interface at least one of a first weight for an item or an off-platter indication that the item is not wholly resting on a weigh platter of the barcode reading and weighing apparatus, identify a weight priority for the item, when the weight priority is a first priority and the indication identifies that item is not wholly resting on the weigh platter, alert a user of the barcode reading and weighing apparatus via the communication interface to reposition and reweigh the item, and receive from the barcode reading and weighing apparatus via the communication interface a second weight for the item, and when the weight priority is a second priority and the item is not wholly resting on the weigh platter, to at least one of charge a customer for the item based on the first weight, or provide a notification that the item is not wholly resting on the weigh platter.

In an even further embodiment, a method of weighing an item with a barcode reading and weighing apparatus includes: receiving from a barcode reading and weighing apparatus via a communication interface at least one of a first weight for an item or a first off-platter indication that the item is not wholly resting on a weigh platter of the barcode reading and weighing apparatus; identifying a weight priority for the item; when the weight priority is a first priority and the indication identifies that item is not wholly resting on the weigh platter, alerting a user of the barcode reading and weighing apparatus via the communication interface that the first weight was invalid, and accessing from the barcode reading and weighing apparatus via the communication interface a second weight for the item; and when the weight priority is a second priority and the item is not wholly resting on the weigh platter, at least one of charging a customer for the item based on the first weight or providing a second off-platter indication that the item is not wholly resting on the weigh platter.

In variations of this embodiment, the method further includes receiving from the barcode reading and weighing apparatus via the communication interface an on or off platter indication.

Figure 1:
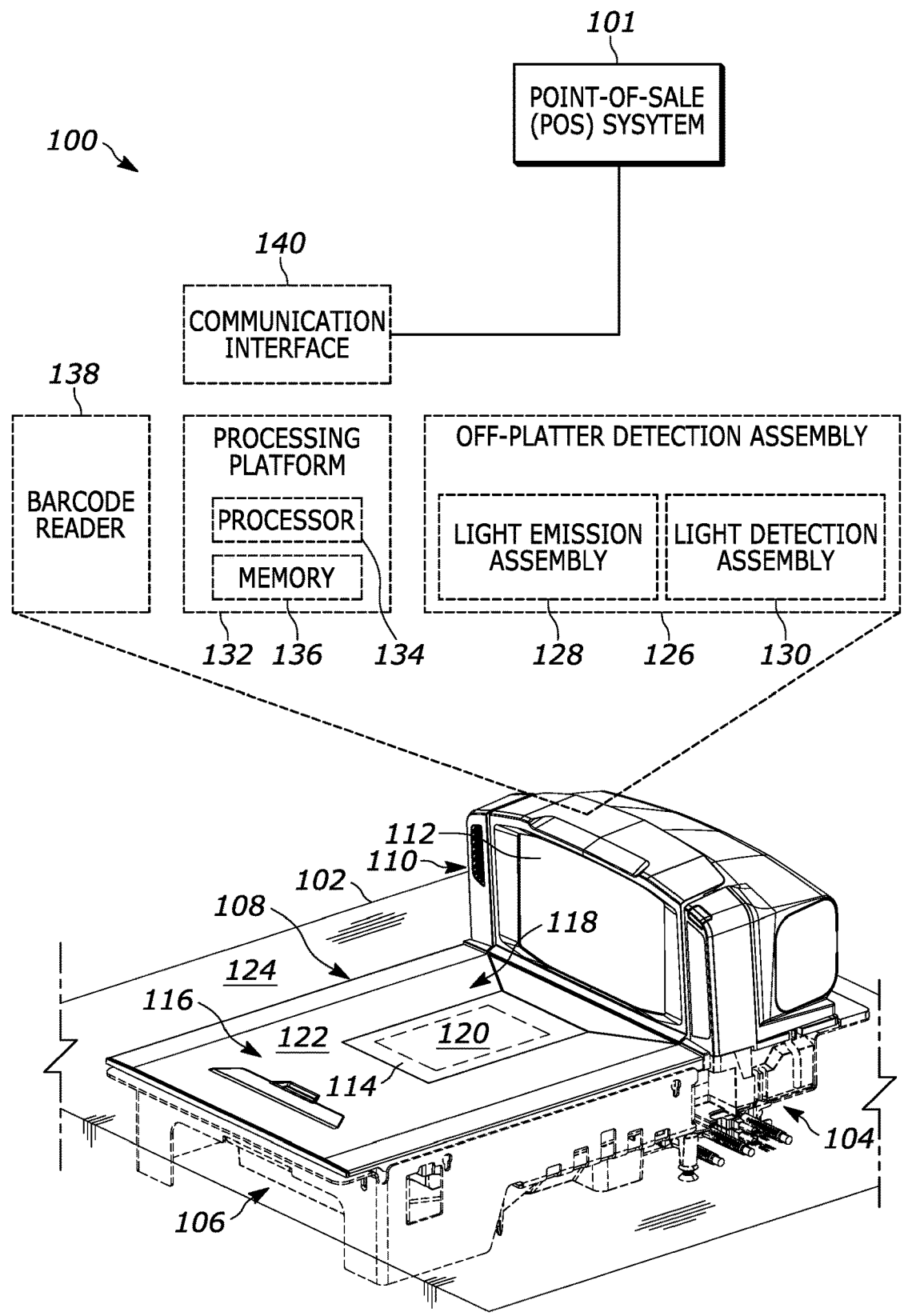
FIG. 1 illustrates an example barcode reading and weighing apparatus, in accordance with aspects of the described embodiments.

In the accompanying figures, like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention. In general, the same reference numbers will be used throughout the drawing(s) and accompanying written description to refer to the same or like parts.

The apparatus and method components have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein. Skilled artisans will readily recognize from the following discussion that alternate embodiments of the structures and methods illustrated herein may be employed without departing from the principles set forth herein.

DETAILED DESCRIPTION

Reference will now be made in detail to non-limiting examples, some of which are illustrated in the accompanying drawings.

The examples disclosed herein relate to methods and apparatus to indicate off-platter weigh conditions for barcode reading and weighing platter apparatus, such as bioptic barcode readers, having off-platter detection assemblies to identify when an object extends off of a weigh platter of the barcode reading and weighing platter apparatus and identify such off-platter weigh conditions to a point-of-sale (POS) system of a retail store.

Referring to FIG. 1, an example barcode reading and weighing apparatus 100, such as the Zebra® MP7000 bioptic barcode reader, is shown. The barcode reading and weighing apparatus 100 can be configured to be physically supported by a workstation 102, such as a checkout counter at a POS of a retail store. The barcode reading and weighing apparatus 100 has an example housing 104 that includes an example lower housing 106 that houses an example weigh platter assembly 108, and an example upper housing 110 that extends generally perpendicular to the lower housing 106. The upper housing 110 includes an example generally vertical window 112 to allow a first set of optical components positioned within the upper housing 110 to form a first field-of-view through the vertical window 112. In addition, if the barcode reading and weighing apparatus 100 is a bioptic barcode scanner, the lower housing 106 will include a generally horizontal window 114, which is positioned in a weigh platter 116 of the weigh platter assembly 108 to allow a second set of optical components positioned within lower housing 106 to form a second field of view through the horizontal window 114. The first and second fields of view intersect to define a product scanning region 118 of the barcode reading and weighing apparatus 100 where a product can be scanned for sale at the POS.

Although the weigh platter assembly 108 can be used with a barcode scanner or bioptic barcode reader, the weigh platter assembly 108 can be used with any type of scanner, reader or POS device 101, or can be used as a stand-alone scale or weighing device. Whether used as part of a barcode reader, scanner or POS device 101, or as a stand-alone scale or weighing device, the weigh platter assembly 108 will generally include the weigh platter 116 and an example scale 120 configured to measure the weight of an object placed on an example surface 122 of the weigh platter 116. The surface 122 extends in a first transverse plane and is generally or substantially parallel to an example top surface 124 of the workstation 102 that at least partially surrounds the weigh platter 116.

To detect an off-platter weigh condition, the barcode reading and weighing apparatus 100 includes an example off-platter detection assembly 126. The off-platter detection assembly 126 includes an example light emission assembly 128, and an example light detection assembly 130. An example processing platform 132 is in communication with the light emission assembly 128 and the light detection assembly 130 and/or, more generally, the off-platter detection assembly 126. The processor platform 132 is in communication with a light source (not shown for clarity of illustration) of the light emission assembly 128, and with a light sensor (not shown for clarity of illustration) of the light detection assembly 130. If the light source of the light emission assembly 128 is configured by the processing platform 132 to emit one or more pulses of light, the processing platform 132 can process light detection information captured by the light detection assembly 130 to detect when a portion of an item, object, etc. is not resting on or is extending over an edge of the weigh platter 116 as an off-platter weigh condition. For simplicity, only a single light emission assembly 128 and only a single light detection assembly 130 are described herein, however, it will be understood that off-platter detection assembly 126 can also include any number and/or type(s) of light emission assemblies, and any number and/or type(s) light detection assemblies may be implemented to detect off-platter weigh condition.

Example methods and apparatus to implement the light emission assembly 128, the light detection assembly 130 and/or, more generally, the off-platter detection assembly 126 to detect when a portion of an item, object, etc. is not resting on or extending over an edge of the weigh platter 116 are disclosed in: U.S. patent application Ser. No. 16/723,999, entitled "Method Of Detecting Item Is Off Platter During Weight Measurement Using Object Recognition Camera," and filed on Dec. 20, 2019; U.S. patent application Ser. No. 16/724,018, entitled "Intelligent Indication in Off Platter Detection Systems," and filed on Dec. 20, 2019; U.S. patent application Ser. No. 16/724,027, entitled "Light Based Off Platter Detection System," and filed on Dec. 20, 2019; U.S. patent application Ser. No. 16/724,043, entitled "Joint Camera-Based Off Platter Detection & Object Recognition System," and filed on Dec. 20, 2019; U.S. patent application Ser. No. 16/724,052, entitled "Parallax-Based Method of Off-Platter Detection," and filed on Dec. 20, 2019; U.S. patent application Ser. No. 16/724,060, entitled "Modular Scale Accuracy Monitor," and filed on Dec. 20, 2019; and U.S. patent application Ser. No. 16/724,082, entitled "Weigh Platter Assembly With Off-Platter Detection," and filed on Dec. 20, 2019. U.S. patent application Ser. No. 16/723,999, U.S. patent application Ser. No. 16/724,018, U.S. patent application Ser. No. 16/724,027, U.S. patent application Ser. No. 16/724,043, U.S. patent application Ser. No. 16/724,052, U.S. patent application Ser. No. 16/724,060, and U.S. patent application Ser. No. 16/724,082 are hereby incorporated herein by reference in their entirety.

The example processing platform 132 includes a processor 134 such as programmable processor, a programmable controller, a graphics processing unit (GPU), a digital signal processor (DSP), etc. Alternatively, an application specific integrated circuit (ASIC), a programmable logic device (PLD), a field programmable gate array (FPGA), a field programmable logic device (FPLD), a logic circuit, etc. may be structured or configured to implement the processing platform 132 and/or the processor 134. The processor platform 132 includes memory 136 to store software, logic and/or computer-readable instructions that may be executed by the processor 134. Example memory 136 include any number or type(s) of non-transitory computer-readable storage medium or disk, such as a hard disk drive (HDD), an optical storage drive, a solid-state storage device, a solid-state drive (SSD), a read-only memory (ROM), a random-access memory (RAM), a compact disc (CD), a compact disc read-only memory (CD-ROM), a digital versatile disk (DVD), a Blu-ray disk, a cache, a flash memory, or any other storage device or storage disk in which information may be stored for any duration (e.g., permanently, for an extended time period, for a brief instance, for temporarily buffering, for caching of the information, etc.). The processing platform 600 shown in FIG. 6 may be used to implement the processing platform 132.

To read, capture, scan, etc. machine-readable codes in the form of numbers and/or a pattern of parallel lines of varying widths, printed on and identifying a product (e.g., a barcode), the barcode reading and weighing apparatus 100 includes a barcode reader 138, a scanner, etc. Barcodes read by the barcode reader 138 are provided to the processing platform 132.

To communicatively couple the barcode reading and weighing apparatus 100 to other systems such as the POS system 101, the barcode reading and weighing apparatus 100 includes one or more communication interfaces, one of which is designated at reference numeral 140. The processing platform 132 can communicate with other systems, such as a POS system 101, via the communication interface 140.

While an barcode reading and weighing apparatus 100 is shown in FIG. 1, one or more of the elements, processes, components, devices, etc. illustrated in FIG. 1 may be combined, divided, re-arranged, omitted, eliminated or implemented in any other way. Further, the barcode reading and weighing apparatus 100 may include one or more elements, processes, components, devices, etc. in addition to, or instead of, those illustrated in FIG. 1, or may include more than one of any or all of the illustrated elements, processes, components, devices, etc.

Figure 2:
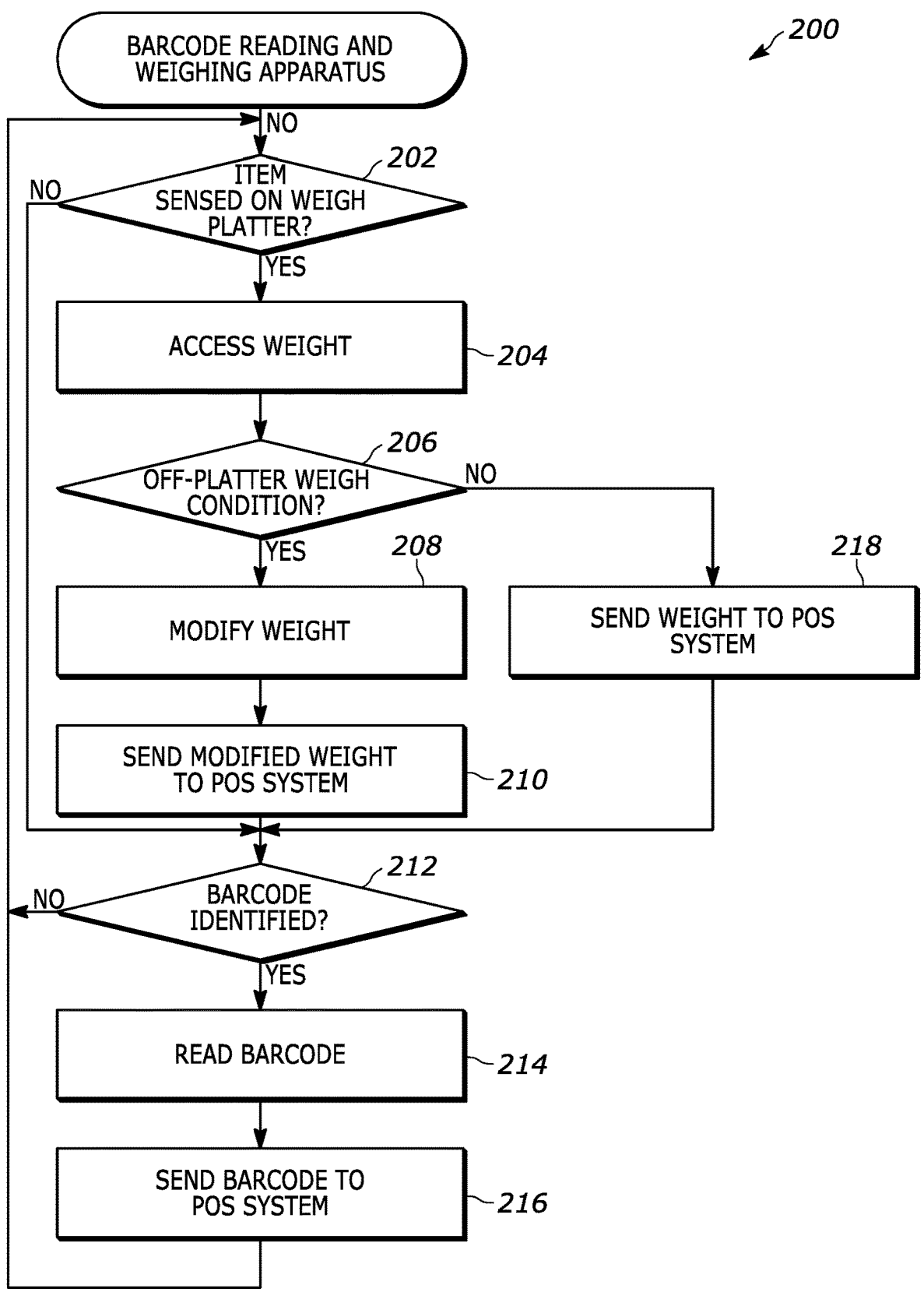
FIG. 2 is a flowchart representative of example methods, logic or machine-readable instructions for implementing the example barcode reading and weighing apparatus of FIG. 1, in accordance with aspects of the described embodiments.

A flowchart 200 representative of example processes, methods, logic, software, computer- or machine-readable instructions for implementing the barcode reading and weighing apparatus 100 is shown in FIG. 2. The program of FIG. 2 begins at block 202. If the processing platform 132 detects an item is on the weigh platter 116 (e.g., by registering a weight via the scale 120) (block 202), the processing platforms 132 accesses (e.g., reads, obtains, retrieves, etc.) the weight (block 204). If the off-platter detection assembly 126 detects an off-platter weigh condition (block 206), the processing platform 132 modifies the weight (block 208). Example modifications include, but are not limited to, changing the weight value to an out-of-bounds value, to an invalid weight, to have a reversed sign, to append a message, indicator, flag, etc., to add a letter character, etc. In some examples, the weight is modified to indicate the off-platter weigh condition such that another system, such as the POS system 101, can obtain the original weight from the modified weight. The processing platform 132 sends the modified weight to, for example, the POS system 101 via the communication interface 140 (block 210). If a barcode was identified by the barcode reader 138 (block 212), the barcode reader 138 reads the barcode (block 214). The processing platform 132 sends the barcode to, for example, the POS system 101 via the communication interface 140 (block 216). Control returns to block 202 to wait for another item to be placed on the weigh platter 116 or a barcode to be identified. Together and/or separately, the modified weight and/or the barcode can be used to charge for the item and/or verify the item.

Returning to block 206, if an off-platter weigh condition is not detected (block 206), the un-modified weight is sent to another system, such as the POS system 101 (block 218), and control proceeds to block 212 to determine whether a barcode was identified (block 212).

Returning to block 202, if an item is not on the weigh platter 116 (block 202), control proceeds to block 212 to determine whether a barcode was identified (block 212).

While the example flowchart of FIG. 2 includes the detection and handling of barcodes, such functionality may be omitted.

Figure 3:
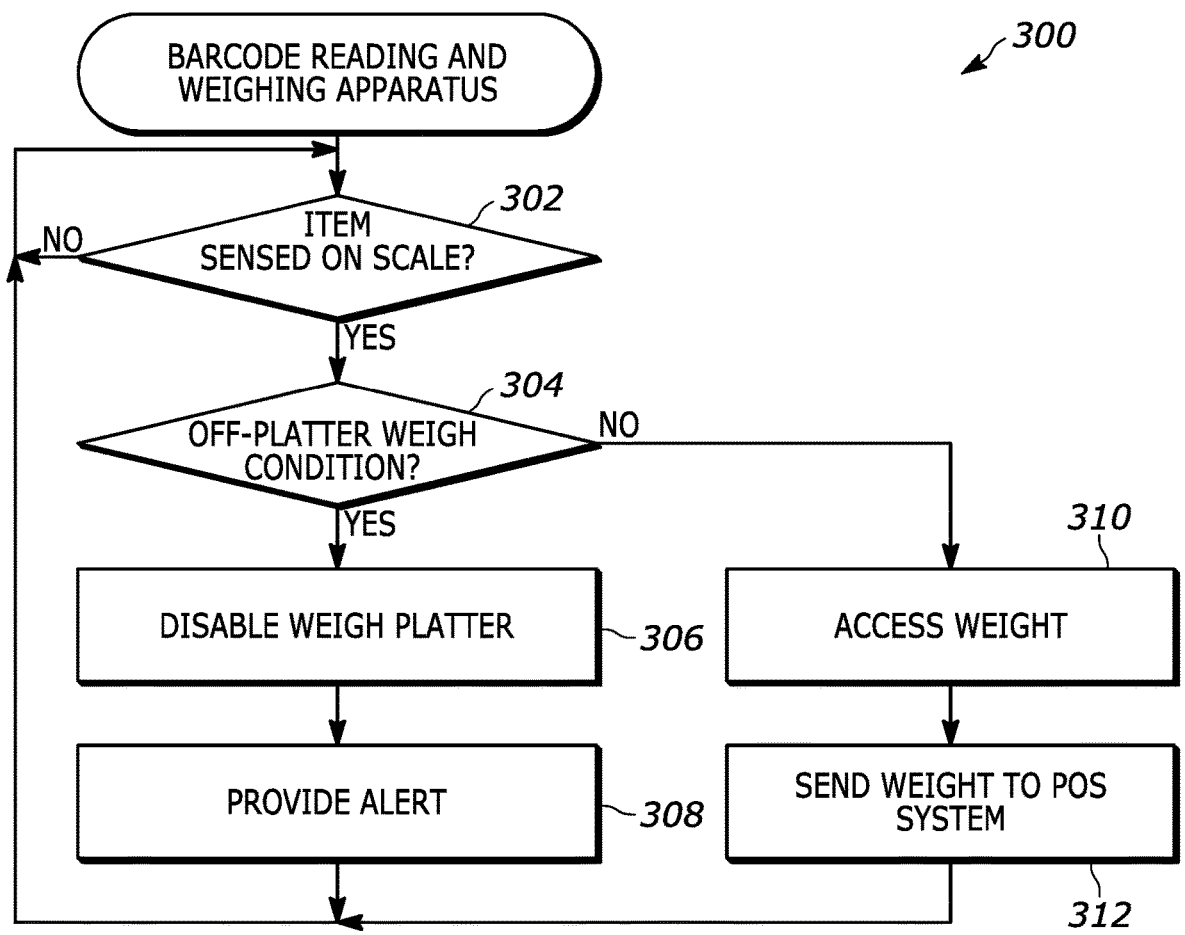
FIG. 3 is a flowchart representative of further example methods, logic or machine-readable instructions for implementing the example barcode reading and weighing apparatus of FIG. 1, in accordance with aspects of the described embodiments.

A flowchart 300 representative of example processes, methods, logic, software, computer- or machine-readable instructions for implementing the barcode reading and weighing apparatus 100 is shown in FIG. 3. The program of FIG. 3 begins at block 302. If the processing platform 132 detects an item is on the weigh platter 116 (e.g., by registering a weight via the scale 120) (block 302), and the processing platform 132 detects an off-platter weigh condition (block 304), the processing platform 132 disables the weigh platter 116 and provides an alert to a user of the barcode reading and weighing apparatus 100 and/or the POS system 101 (block 308). Control returns to block 302 to wait for another item to be placed on the weigh platter 116. In some examples, a measured weight is sent to the POS system 101.

Returning to block 304, if an off-platter weigh condition is not detected (block 304), a weight is measured by the scale 120 (block 310) and sent to another system, such as the POS system 101 (block 312).

Figure 4:
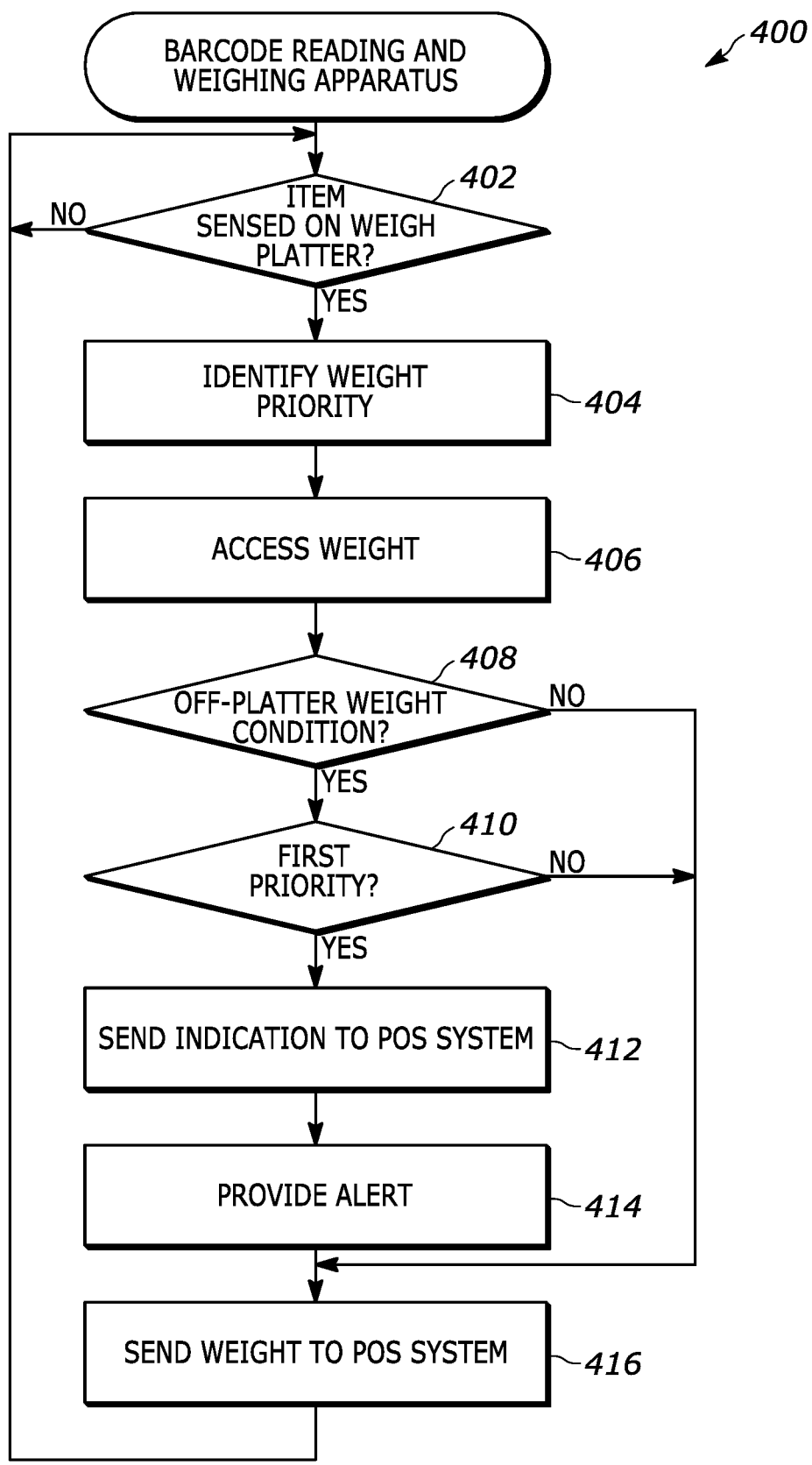
FIG. 4 is a flowchart representative of further still example methods, logic or machine-readable instructions for implementing the example barcode reading and weighing apparatus of FIG. 1, in accordance with aspects of the described embodiments.

A flowchart 400 representative of example processes, methods, logic, software, computer- or machine-readable instructions for implementing the barcode reading and weighing apparatus 100 is shown in FIG. 4. The program of FIG. 4 begins at block 402. If the processing platform 132 detects an item is on the weigh platter 116 (e.g., by registering a weight via the scale 120) (block 402), the processing platform 132 identifies a weight priority for the item (block 404). The weight priority can be identified by comparing an item identifier (e.g., a barcode, a PLU code, etc.) with a list of items to obtain it's assigned (e.g., associated, etc.) the weight priority. A weight priority can represent a relative importance of obtaining an accurate weight. For example, a low priority might be assigned to a less expensive item or a lower cost-per-unit-weight item, while a high priority might be assigned to a more expensive item or a higher cost-per-unit-weight item. Accordingly, it may be more important to a retailer to accurately weigh high priority items, as off-platter weigh conditions would result in the item be under weighed. In some examples, a determination of high priority versus low priority is based on a cost-per-unit-weight threshold. The threshold may be adjusted or set by a retailer.

The processing platform 132 accesses the measured weight of the item (block 406). If there is an off-platter weigh condition (block 408), and the item has a high priority (block 410), then the processing platform 132 sends an indication to, for example, the POS system 101 via the communication interface 140 (block 412) that a high priority item was incorrectly weighed. The processing platform 132 provides an alert to a user of the barcode reading and weighing apparatus 100 and/or the POS system 101 that a high priority item was incorrectly weighed (block 414). The processing platform 132 sends the measured weight to the POS system (block 416), and control returns to block 402 to wait for another item to be placed on the weigh platter 116.

If there is not an off-platter weigh condition (block 408) or an off-platter weigh condition for a low priority item (block 410), the processing platform 132 sends the measured weight to the POS system (block 416) and optionally logs the off-platter weigh condition event and/or sends an indication to POS system (not shown), and control returns to block 402 to wait for another item to be placed on the weigh platter 116.

In some examples, the flowchart 400 of FIG. 4 is modified to include barcode detection and barcode reading, as shown in the flowchart 200 of FIG. 2.

Figure 5:
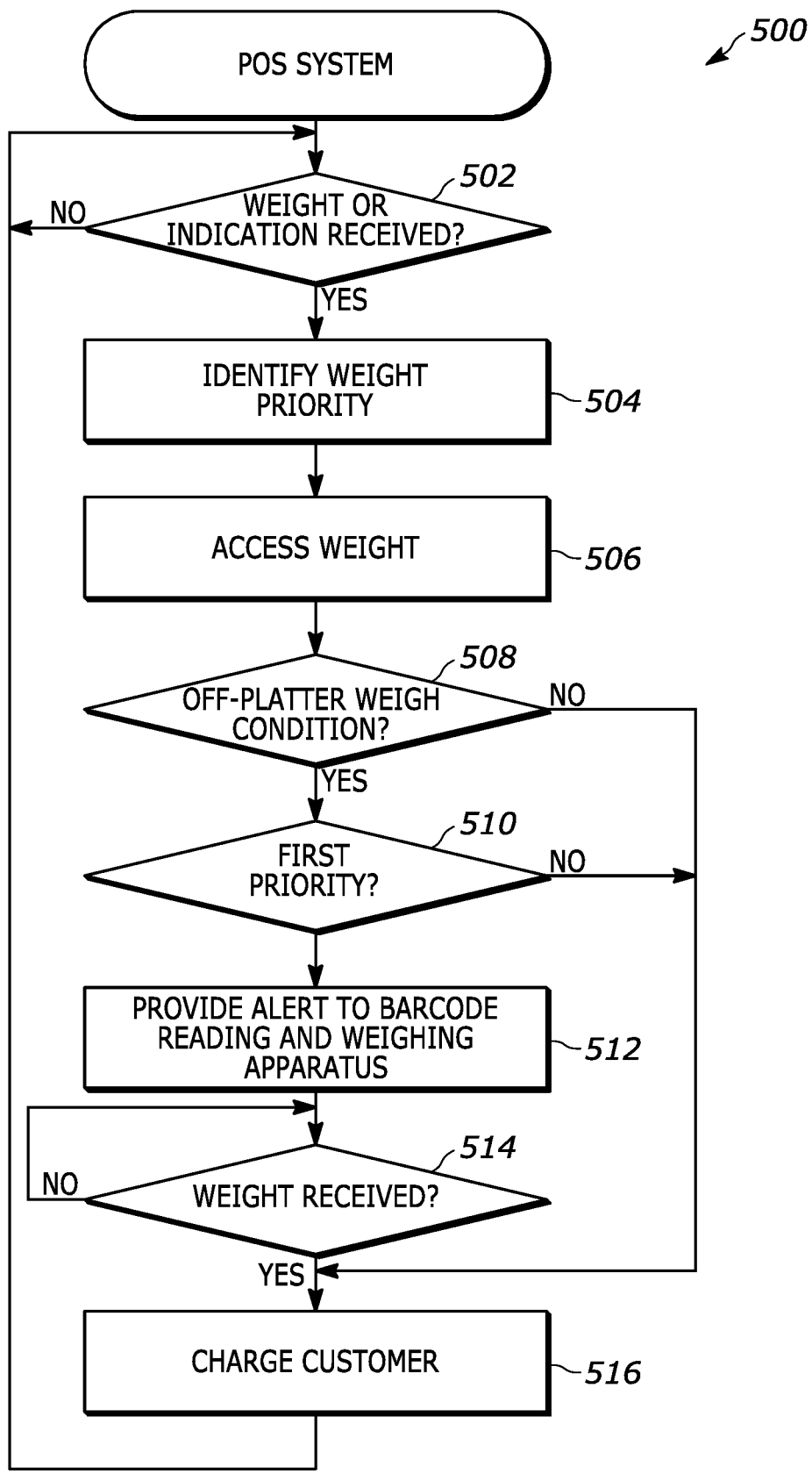
FIG. 5 is a flowchart representative of further still example methods, logic or machine-readable instructions for implementing the example point-of-sale (POS) system of FIG. 1, in accordance with aspects of the described embodiments.

A flowchart 500 representative of example processes, methods, logic, software, computer- or machine-readable instructions for implementing the barcode reading and weighing apparatus 100 is shown in FIG. 5. The program of FIG. 5 begins at block 502. If the POS system 101 receives a weight and/or indication of off-platter weigh condition (block 502), the POS system 101 identifies a weight priority for the item (block 504). The weight priority can be identified by comparing an item identifier (e.g., a barcode, a PLU code, etc.) with a list of items to obtain it's assigned the weight priority. In some examples, a determination of high priority versus low priority is based on a cost-per-unit-weight threshold. The threshold may be adjusted or set by a retailer. The POS system 101 accesses the weight (block 506) and determines whether there is an off-platter weigh condition (block 508). If there is an off-platter weigh condition (block 508) and the item is high priority (block 510), then the POS system 101 sends an alert to the barcode reading and weighing apparatus 100 to reweigh the item (block 512). When a weight is received (block 514), the POS system charges the customer for the item (block 516), and control returns to block 502 to wait for another weight and/or indication. In some examples, the flowchart 500 of FIG. 5 is modified to include barcode detection and barcode reading, as shown in the flowchart 200 of FIG. 2.

Figure 6:
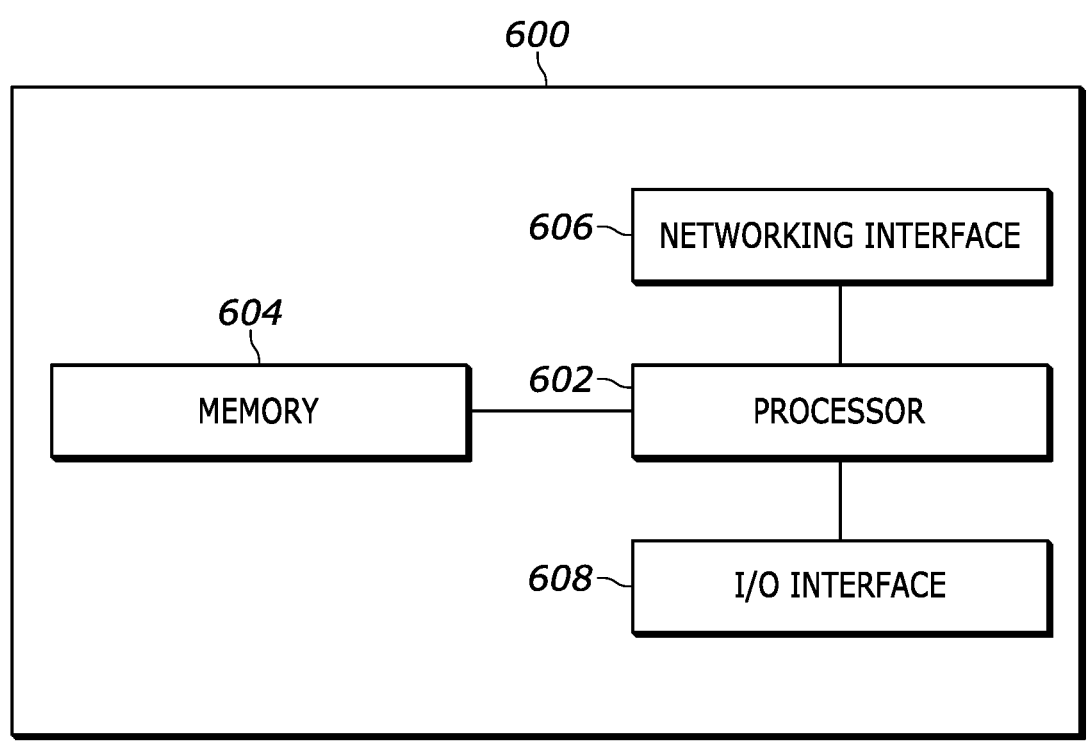
FIG. 6 is a block diagram of an example logic circuit to implement the example methods, apparatus, logic and/or operations described herein.

The processes, methods, logic, software and instructions of FIGS. 2-5 may be an executable program or portion of an executable program for execution by a processor such as the processor 602 of FIG. 6. The program may be embodied in software or instructions stored on a non-transitory computer- or machine-readable storage device, storage medium and/or storage disk such as a memory, a CD, a compact disc read-only memory CD-ROM, a hard drive, an SSD, a DVD, a Blu-ray disk, a cache, a flash memory, a ROM, a RAM, or any other storage device, medium or storage disk associated with the processor 402 in which information is stored for any duration (e.g., for extended time periods, permanently, for brief instances, for temporarily buffering, and/or for caching of the information). Further, although the example program is described with reference to the flowchart 200 illustrated in FIG. 2, the flowchart 300 illustrated in FIG. 3, the flowchart 400 illustrated in FIG. 4 and the flowchart 500 illustrated in FIG. 5 many other methods of implementing the barcode reading and weighing apparatus 100 may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, an ASIC, a PLD, an FPGA, an FPLD, a logic circuit, hardware logic, hardware implemented state machines, etc.) structured to perform the corresponding operation without executing software or instructions.

FIG. 6 is a block diagram representative of an example logic circuit capable of implementing, for example, one or more components of the off-platter detection assembly 126, the light emission assembly 128, the light detection assembly 130, the barcode reader 138, the communication interface 140 or, more generally, the barcode reading and weighing apparatus 100, and the POS system 101. The logic circuit of FIG. 6 is a processing platform 600 capable of executing instructions to, for example, implement operations of the example methods described herein, as may be represented by the flowcharts of the drawings that accompany this description. Other example logic circuits capable of, for example, implementing operations of the example methods described herein include FPGAs and ASICs.

The example processing platform 600 of FIG. 6 includes an example processor 602 such as, for example, one or more microprocessors, controllers, and/or any suitable type of processor. The processing platform 600 of FIG. 6 includes memory (e.g., volatile memory, non-volatile memory) 604 accessible by the processor 602 (e.g., via a memory controller). The processor 602 interacts with the memory 604 to obtain, for example, machine-readable instructions stored in the memory 604 corresponding to, for example, the operations represented by the flowcharts and/or examples of this disclosure. Additionally or alternatively, machine-readable instructions corresponding to the example operations described herein may be stored on one or more removable media (e.g., a CD, a DVD, removable flash memory, etc.) that may be coupled to the processing platform 600 to provide access to the machine-readable instructions stored thereon. The machine-readable instructions may be executed by the processor 602 to implement the off-platter detection assembly 126, the light emission assembly 128, the light detection assembly 130, the barcode reader 138, the communication interface 140 or, more generally, the barcode reading and weighing apparatus 100 and the POS system 101.

The example processing platform 600 of FIG. 6 also includes a network interface 606 to enable communication with other machines via, for example, one or more networks. The network interface 606 includes any suitable type of communication interface(s) (e.g., wired and/or wireless interfaces) configured to operate in accordance with any suitable protocol(s). The network interface 606 may be used to implement the communication interface 140.

The processing platform 600 of FIG. 6 also includes input/output (I/O) interfaces 608 to obtain weights from the scale 120, obtain off-platter weigh condition indications, interact (e.g., control and receive data from) with barcode reader 138, interact the off-platter detection assembly, interact with the light emission assembly 128, interact the light detection assembly 130.

Although FIG. 6 depicts the I/O interfaces 608 as a single block, the I/O interfaces 608 may include a number of different types of I/O circuits or components that enable the processor 602 to communicate with peripheral I/O devices. Example interfaces 608 include an Ethernet interface, a universal serial bus (USB), a Bluetooth® interface, a near field communication (NFC) interface, and/or a PCI Express interface. The peripheral I/O devices may be any desired type of I/O device such as a keyboard, a display (a liquid crystal display (LCD), a cathode ray tube (CRT) display, a light emitting diode (LED) display, an organic light emitting diode (OLED) display, an in-place switching (IPS) display, a touch screen, etc.), a navigation device (a mouse, a trackball, a capacitive touch pad, a joystick, etc.), a speaker, a microphone, a printer, a button, a communication interface, an antenna, etc.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more DSPs, one or more ASICs, one or more FPGAs, one or more MCUs, one or more hardware accelerators, one or more special-purpose computer chips, and one or more SoC devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. A barcode reading and weighing apparatus, the apparatus comprising:
    a weigh platter having a surface extending in a first transverse plane;
    a scale configured to measure a weight of an item on the surface;
    an off-platter detection assembly configured to detect whether a portion of the item is not resting on the weigh platter;
    a communication interface configured to communicate with a point-of-sale (POS) system;
    a processor in communication with the weigh platter, the off-platter detection assembly and the communication interface; and
    a non-transitory computer-readable storage medium storing instructions that, when executed by the processor, cause the barcode reading and weighing apparatus to, when the portion of the item is not resting on the weigh platter, modify the weight to form a modified weight and send the modified weight to the POS system via the communication interface, wherein the weight is modified to indicate the portion of the item was not resting on the weigh platter, and wherein modifying the weight to form the modified weight consist of at least one of changing the weight to an out-of-bounds weight or changing the weight to an invalid weight.

2. The barcode reading and weighing apparatus of claim 1, wherein the storage medium stores further instructions that, when executed, cause the barcode reading and weighing apparatus to, when the item is wholly resting on the weigh platter, send the weight to the POS system via the communication interface.

3. The barcode reading and weighing apparatus of claim 1, wherein the barcode reading and weighing apparatus comprises an additional surface around the weigh platter, wherein the surface is substantially coplanar with the weigh platter.

4. The barcode reading and weighing apparatus of claim 1, wherein modifying the weight includes modifying the weight to represent an out-of-bounds weight.

5. The barcode reading and weighing apparatus of claim 1, wherein modifying the weight includes modifying the weight to represent an invalid weight.

6. The barcode reading and weighing apparatus of claim 1, wherein modifying the weight includes modifying the weight to include a letter.

7. The barcode reading and weighing apparatus of claim 1, wherein modifying the weight includes modifying the weight to have an inverted sign.

8. The barcode reading and weighing apparatus of claim 1, further comprising a barcode reader to read a barcode on the item.

9. The barcode reading and weighing apparatus of claim 1, wherein the off-platter detection assembly includes:
    a light emission assembly having a light source, the light emission assembly configured to emit a light away from a proximal edge of the surface; and
    a light detection assembly having a light sensor, the light detection assembly configured to detect at least a portion of the light reflected towards the proximal edge.

10. A method of weighing an item with a barcode reading and weighing apparatus, the method comprising:
    determining a weight of an item on a weigh platter of the barcode reading and weighing apparatus;
    detecting whether a portion of the item is not resting on the weigh platter;
    when the portion of the item is not resting on the weigh platter, modifying the weight to form a modified weight to indicate that the portion of the item was not resting on the weigh platter; and
    sending the modified weight to a point-of-sale (POS) system,
    and wherein the modifying the weight to form the modified weight consist of at least one of changing the weight to an out-of-bounds weight or changing the weight to an invalid weight.

11. The method of claim 10, further comprising when the item is wholly resting on the weigh platter, sending the weight to the POS system.

12. The method of claim 10, wherein modifying the weight includes modifying the weight to represent at least one of an out-of-bounds weight, to be an invalid weight, to include a letter, or to have an inverted sign.

13. The method of claim 10, wherein the weight can be obtained from the modified weight at the POS system.

14. A barcode reading and weighing apparatus, the barcode reading and weighing apparatus comprising:
    a weigh platter having a surface extending in a first transverse plane;
    a scale configured to measure a weight of an item on the surface;
    an off-platter detection assembly configured to detect whether a portion of the item is not resting on the weigh platter;
    a communication interface configured to communicate with a point-of-sale (POS) system;
    a processor in communication with the weigh platter, the off-platter detection assembly and the communication interface; and
    a non-transitory computer-readable storage medium storing instructions that, when executed by the processor, cause the barcode reading and weighing apparatus to:
        identify a weight priority associated with the item,
        when the weight priority is a first priority and the item is not wholly resting on the weigh platter, provide an indication that the item is not wholly resting on weigh platter, and
        when the weight priority is a second priority and the item is not wholly resting on the weigh platter, send the weight measured by the scale to a POS system.

15. The barcode reading and weighing apparatus of claim 14, wherein the weight is useable at the POS system to at least one of charge a customer for the item, or verify the item.

16. The barcode reading and weighing apparatus of claim 14, wherein the storage medium stores further instructions that, when executed by the processor, cause the barcode reading and weighing apparatus to provide the indication to the POS system.

17. The barcode reading and weighing apparatus of claim 14, further comprising a barcode reader to read a barcode on the item.

18. The barcode reading and weighing apparatus of claim 14, wherein the storage medium stores further instructions that, when executed by the processor, cause the barcode reading and weighing apparatus to, when the weight priority is the first priority and the item is not wholly resting on the weigh platter, additionally provide the measured weight.

19. The barcode reading and weighing apparatus of claim 14, wherein the storage medium stores further instructions that, when executed by the processor, cause the barcode reading and weighing apparatus to alert a user of the barcode reading and weighing apparatus of an invalid weight when the weight priority is the first priority and the item is not wholly resting on the weigh platter, and not alert the user when the weight priority is the second priority and the item is not wholly resting on the weigh platter.

20. The barcode reading and weighing apparatus of claim 14, wherein the first priority is associated with at least one of a more expensive item or a higher cost-per-unit-weight item, and the second priority is associated with at least one of a less expensive item or a lower cost-per-unit-weight item.

21. The barcode reading and weighing apparatus of claim 20, wherein the non-transitory computer-readable storage medium storing instructions, when executed by the processor, cause the barcode reading and weighing apparatus to identify the item with the first priority or the second priority based on a user controllable threshold.

22. The barcode reading and weighing apparatus of claim 14, wherein the storage medium stores further instructions that, when executed by the processor, cause the barcode reading and weighing apparatus to determine an identification of the item using at least one of an object recognition algorithm trained using machine learning, a barcode or a radio frequency identification (RFID) tag, and compare the identification with a list of identifiers associated with priority items.

23. The barcode reading and weighing apparatus of claim 14, wherein the storage medium stores a list of item identifiers associated with the first priority.

\* \* \* \* \*